US012597097B2

(12) United States Patent
Fujimoto

(10) Patent No.: US 12,597,097 B2
(45) Date of Patent: Apr. 7, 2026

(54) INFORMATION PROCESSING DEVICE, MEASUREMENT SYSTEM, IMAGE PROCESSING METHOD, AND NON-TRANSITORY STORAGE MEDIUM

(71) Applicant: ARKRAY, Inc., Kyoto (JP)

(72) Inventor: Koji Fujimoto, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 199 days.

(21) Appl. No.: 18/225,271

(22) Filed: Jul. 24, 2023

(65) Prior Publication Data

US 2024/0037706 A1 Feb. 1, 2024

(30) Foreign Application Priority Data

Jul. 29, 2022 (JP) ................................. 2022-122229

(51) Int. Cl.
| | |
|---|---|
| G06T 5/50 | (2006.01) |
| G01N 21/05 | (2006.01) |
| G06T 3/4038 | (2024.01) |
| H04N 23/667 | (2023.01) |

(52) U.S. Cl.
CPC .............. G06T 5/50 (2013.01); G01N 21/05 (2013.01); G06T 3/4038 (2013.01); H04N 23/667 (2023.01); *G06T 2207/20221* (2013.01)

(58) Field of Classification Search
CPC .................... G06T 5/50; G06T 3/4038; G06T 2207/20221; G06T 11/00; G01N 21/05; G01N 15/1429; H04N 23/667
See application file for complete search history.

(56) References Cited

U.S. PATENT DOCUMENTS

| | | | | |
|---|---|---|---|---|
| 10,184,878 | B2 * | 1/2019 | Smolak | ............... G01N 15/1459 |
| 2007/0215817 | A1 * | 9/2007 | Shirai | .................... G01J 3/2803 |
| | | | | 250/458.1 |
| 2016/0169801 | A1 * | 6/2016 | Rogacs | ................ G01N 33/582 |
| | | | | 435/6.12 |
| 2016/0340636 | A1 | 11/2016 | Tabata et al. | |
| 2018/0299364 | A1 | 10/2018 | Goda et al. | |
| 2020/0032196 | A1 | 1/2020 | Tabata et al. | |

(Continued)

FOREIGN PATENT DOCUMENTS

| | | | |
|---|---|---|---|
| JP | 6321279 | B2 | 5/2018 |
| JP | 2020-085535 | A | 6/2020 |

(Continued)

OTHER PUBLICATIONS

Extended European Search Report issued in the corresponding Application No. 23188510.4, dated Jan. 2, 2024.

*Primary Examiner* — Daniel F Hajnik
*Assistant Examiner* — Thomas John Foster
(74) *Attorney, Agent, or Firm* — Morgan, Lewis & Bockius LLP

(57) ABSTRACT

An information processing device includes an acquisition section that is coupled to a camera that continuously images a sample including a material component and flowing through a flow cell in time series and generates a first image of the sample and a second image in which a portion continuous to the first image in time series overlaps a part of the first image, and acquires the first image and the second image generated by the camera, and an image output section that outputs a composite image obtained by combining the first image and the second image.

17 Claims, 8 Drawing Sheets

(56) References Cited

U.S. PATENT DOCUMENTS

| | | | |
|---|---|---|---|
| 2020/0160094 A1 | 5/2020 | Fujimoto et al. | |
| 2020/0294286 A1* | 9/2020 | Helle | G01R 33/5608 |
| 2023/0070781 A1* | 3/2023 | Teramoto | G01N 21/73 |

FOREIGN PATENT DOCUMENTS

| | | | |
|---|---|---|---|
| JP | 6713730 B2 | 6/2020 | |
| WO | 2018/227193 A1 | 12/2018 | |

* cited by examiner

FIG.4

INFORMATION PROCESSING DEVICE, MEASUREMENT SYSTEM, IMAGE PROCESSING METHOD, AND NON-TRANSITORY STORAGE MEDIUM

CROSS-REFERENCE TO RELATED APPLICATION

This application is based on and claims priority under 35 USC 119 from Japanese Patent Application No. 2022-122229 filed on Jul. 29, 2022, the disclosure of which is incorporated by reference herein.

BACKGROUND

Technical Field

The present disclosure relates to an information processing device, a measurement system, an image processing method, and a non-transitory storage medium.

For example, Japanese Patent Application Laid-Open (JP-A) No. 2020-85535 describes an information processing device capable of classifying material component images obtained by image photographing by a flow method for each predetermined classification. This information processing device includes a classification section that cuts out a material component image recognized as a material component from plural images including plural types of material components and obtained by photographing a specimen fluid flowing through a flow cell, and classifies the cut out material component image as a detection component for each predetermined classification, and a control section that, in a case in which the material component image classified as the detection component by the classification section is reclassified into different classifications, receives selection of a classification of a movement destination in a state in which a first image list of the material component images included in the classification of the detection component is displayed at a display, and further performs control to move the material component image selected from the first image list to a second image list in a state in which the first image list and the second image list of the material component images included in the classification of the movement destination are simultaneously displayed at the display.

Japanese Patent No. 6713730 describes a cell detection device that detects particles in a measurement sample flowing through a flow cell. This cell detection device includes a flow cell for flowing a measurement sample including particles, a particle detection unit for detecting particles in the measurement sample supplied to the flow cell, a particle selection unit for selecting particles that satisfy a detection condition and other particles based on a detection result by the particle detection unit, a sample supply unit for supplying an imaging sample including particles that satisfy the detection condition selected by the particle selection unit to the flow cell, and a particle imaging unit for imaging particles in the imaging sample after selection supplied to the flow cell. The sample supply unit includes an intermediate storage section for storing and concentrating an imaging sample including particles satisfying the detection condition selected by the particle selection unit, and a return flow path for returning the imaging sample concentrated in the intermediate storage section to an upstream side of the flow cell with respect to a detection position of the particle detection unit and causing the imaging sample to flow into the flow cell again.

Japanese Patent No. 6321279 describes an imaging device that images a measurement sample while flowing the measurement sample into a flow cell. This imaging device includes a probe beam generation unit that generates a probe beam, a dispersive Fourier transform unit that performs dispersive Fourier transform on a probe beam and maps a spectrum of the probe beam in a time domain, a spatial mapping unit that spatially maps the dispersive Fourier transformed probe beam and irradiates algae or cells, a beam detection unit that detects transmitted light having transmitted the algae or cells, and an image generation unit that generates an image of the algae or cells based on intensity of the transmitted light.

The techniques in the related art described in Japanese Patent Application Laid-Open (JP-A) No. 2020-85535, Japanese Patent No. 6713730, and Japanese Patent No. 6321270 relate to a technique for automatically analyzing a material component included in urine, and are effective for screening for an in-urine material component analysis. However, when a problem such as a positive in some items is found as a result of screening, it is necessary to perform a re-examination (hereinafter, referred to as "microscopic examination") using a microscope by a laboratory technician or the like. In this microscopic examination, for example, a relatively large amount of man-hours such as for creating a slide (specimen) for the microscopic examination is required. Therefore, there is a case in which an image obtained by imaging a sample including a material component is set as an observation target instead of the slide (specimen), but visibility of the material component in the image is not good because frame-cut images are checked one by one.

SUMMARY

The disclosure has been made in view of the above points, and provides an information processing device, a measurement system, an image processing method, and a non-transitory storage medium capable of improving visibility of a material component in an image obtained by imaging a sample including the material component.

An information processing device according to one aspect of the disclosure is an information processing device coupled to an imaging unit that continuously images a sample including a material component and flowing through a flow cell in time series and generates a first image of the sample and a second image in which a portion continuous to the first image in time series overlaps a part of the first image, the information processing device including: an acquisition section configured to acquire the first image and the second image, which are generated by the imaging unit, and an image output section configured to output a composite image obtained by combining the first image and the second image.

According to the disclosure, visibility of a material component in an image obtained by imaging a sample including the material component can be improved.

BRIEF DESCRIPTION OF THE DRAWINGS

FIG. 4 is a block diagram illustrating an example of a functional configuration of the information processing device according to the embodiment.

DETAILED DESCRIPTION

Figure 1:
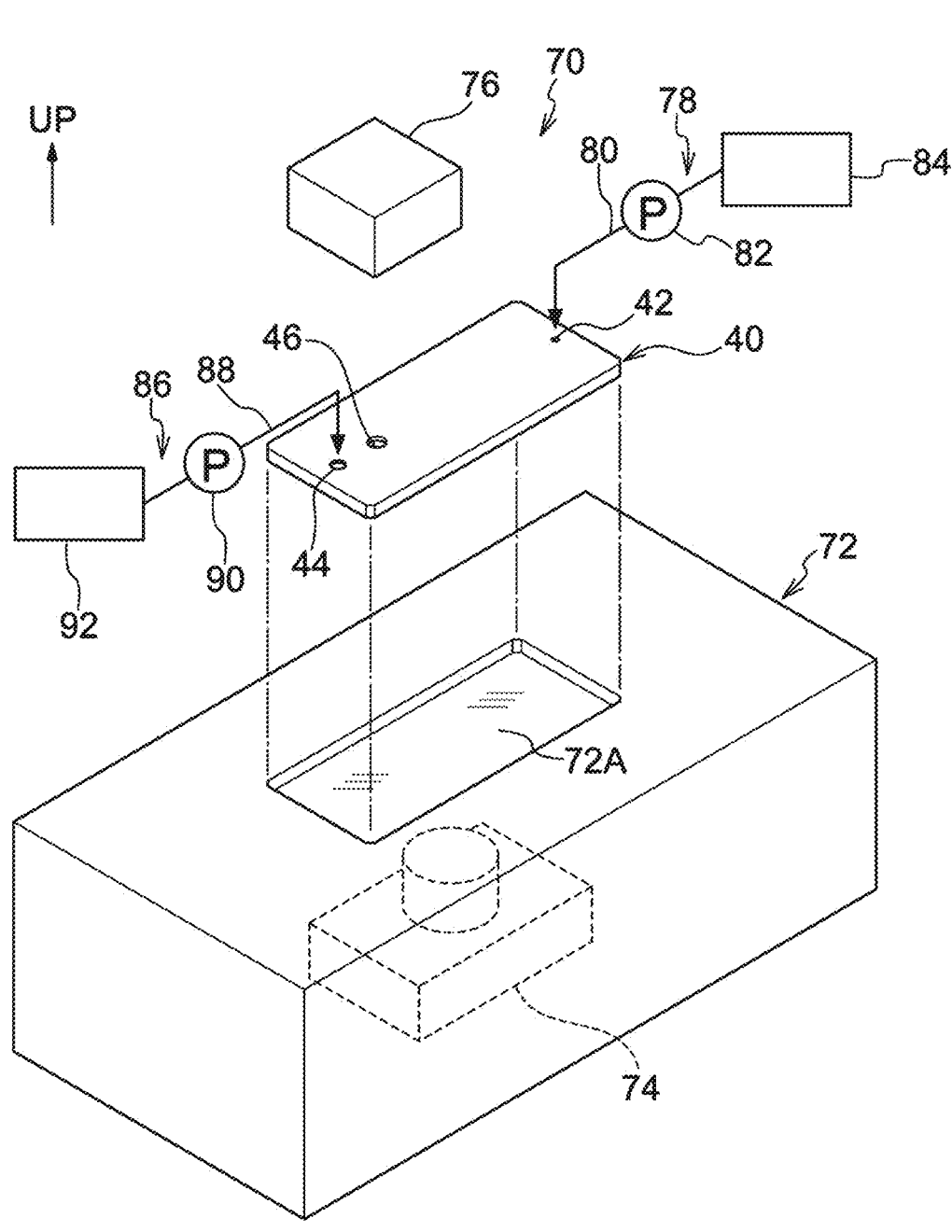
FIG. 1 is a perspective view illustrating a part of a configuration of a measurement system according to an embodiment.

Hereinafter, an example of a mode for carrying out the technique of the disclosure will be described in detail with reference to the drawings. Components and processing having the same operation, action, and function are denoted by the same reference numerals throughout the drawings, and redundant description may be omitted, as appropriate. Each drawing is only schematically illustrated to the extent that the technique of the disclosure can be sufficiently understood. Therefore, the technique of the disclosure is not limited only to the illustrated example. In the present embodiment, description of configurations that are not directly related to the disclosure or well-known configurations may be omitted.

FIG. 1 is a perspective view illustrating a part of a configuration of a measurement system 70 according to the present embodiment.

As illustrated in FIG. 1, the measurement system 70 according to the present embodiment includes a flow cell 40, a housing 72, a camera 74, and a light source 76. An arrow UP illustrated in FIG. 1 indicates an upper side of the measurement system 70 in a vertical direction.

For example, the flow cell 40 according to the present embodiment is applied to an in-urine material component examination (urine sediment examination) in which a material component in a urine specimen is imaged by the camera 74 by introducing the urine specimen, which is an example of a specimen fluid, together with a sheath fluid, and various types of analyses are performed from a shape or the like of the material component in the imaged image.

The "sample" according to the present embodiment includes the sheath fluid and the specimen fluid, but only the specimen fluid may be used without using the sheath fluid. The camera 74 is an example of an imaging unit. The urine specimen includes a plurality of types of material components. Examples of the type of the material component include red blood cells, white blood cells, epithelial cells, cylinders, and bacteria, for example. In the present embodiment, although a case of performing an in-urine material component examination using a urine specimen as an example of the specimen fluid will be described, it can also be used for a material component examination for blood, cells, body fluids, and the like.

The measurement system 70 includes the housing 72 in which the flow cell 40 is disposed. A recess 72A into which the flow cell 40 is inserted is formed in the housing 72, and a portion of a position including the recess 72A of the housing 72 is formed of a transparent member (for example, glass or the like). In the housing 72, the camera 74 is provided at a position facing the flow cell 40. On the upper side of the housing 72, the light source 76 is provided at a position facing the camera 74 with the flow cell 40 interposed therebetween. The camera 74 is disposed at a position where a sample flowing through the flow cell 40 can be imaged.

The measurement system 70 includes a first supply device 78 that supplies a specimen fluid to a specimen intake port 42 of a specimen flow path (not illustrated) in the flow cell 40. The first supply device 78 includes a supply pipe 80 having one end portion coupled to the specimen intake port 42, a pump 82 provided in the middle of the supply pipe 80, and a specimen storage section 84 coupled to the other end portion of the supply pipe 80 and storing a specimen fluid.

The measurement system 70 includes a second supply device 86 that supplies a sheath fluid to a sheath intake port 44 of a sheath flow path (not illustrated) in the flow cell 40. The second supply device 86 includes a supply pipe 88 having one end portion coupled to the sheath intake port 44, a pump 90 provided in the middle of the supply pipe 88, and a tank 92 coupled to the other end portion of the supply pipe 88 and storing the sheath fluid. The first supply device 78 and the second supply device 86 are examples of the sample supply unit.

The flow cell 40 includes a discharge port 46 between the specimen intake port 42 and the sheath intake port 44. One end portion of a discharge pipe (not illustrated) is coupled to the discharge port 46, and the other end portion of the discharge pipe is coupled to a disposal tank (not illustrated). The flow cell 40 includes a merging portion (not illustrated) that merges the specimen introduced from the specimen intake port 42 and the sheath liquid introduced from the sheath intake port 44, and the merged fluid (sample) flows in the flow path. The camera 74 images a material component in the merged fluid.

Figure 2:
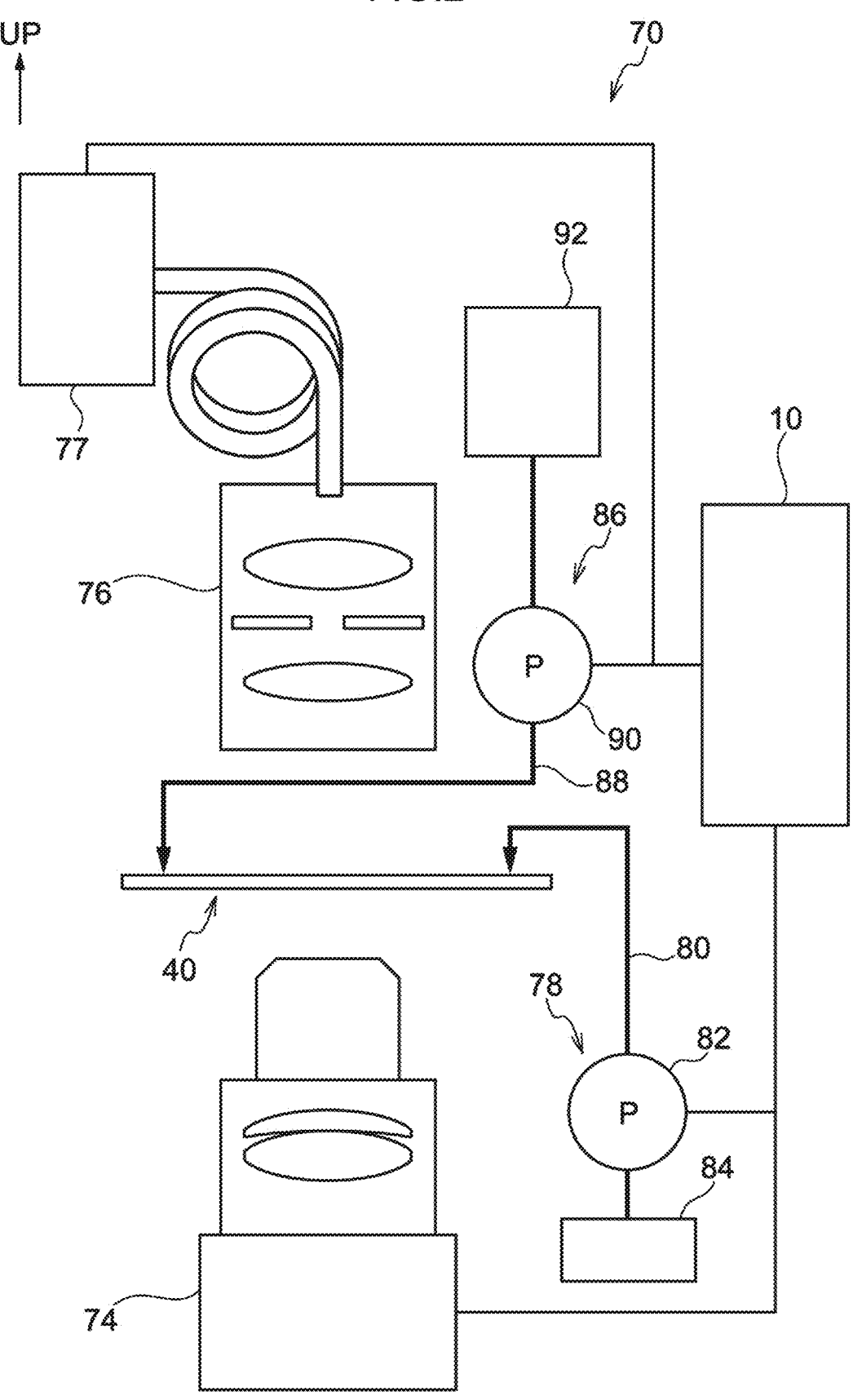
FIG. 2 is a schematic diagram illustrating an example of a configuration of the measurement system according to the embodiment.

FIG. 2 is a schematic diagram illustrating an example of a configuration of the measurement system 70 according to the present embodiment.

As illustrated in FIG. 2, the measurement system 70 according to the present embodiment includes an information processing device 10. The arrow UP illustrated in FIG. 2 indicates the upper side of the measurement system 70 in the vertical direction, similarly to FIG. 1.

The information processing device 10 has a function as a control device that respectively controls operations of the camera 74, a light source activation unit 77 electrically coupled to the light source 76, the pump 82, and the pump 90. The information processing device 10 gives a pulse signal to the light source activation unit 77 to cause the light source 76 to emit light at predetermined intervals. The information processing device 10 drives the pump 82 to control a flow rate of the specimen fluid, and drives the pump 90 to control a flow rate of the sheath fluid. Although not illustrated, a plurality of cameras 74 and an optical system that guides light to each camera 74 may be provided. Each optical system is adjusted such that each camera 74 is focused at a different position (depth) in the flow cell 40. In other words, the plurality of cameras 74 simultaneously image a plurality of images focused at different depth positions at the same position on the horizontal plane. The imaged images simultaneously imaged are stored in a storage section 15 illustrated in FIG. 3 described later in association with each other. A depth direction described herein is a direction perpendicular to a direction in which the specimen fluid flows, and means the vertical direction in FIG. 2. A distance between each focal point and a wall surface of the flow cell 40 on the side close to the camera 74 is different.

Figure 3:
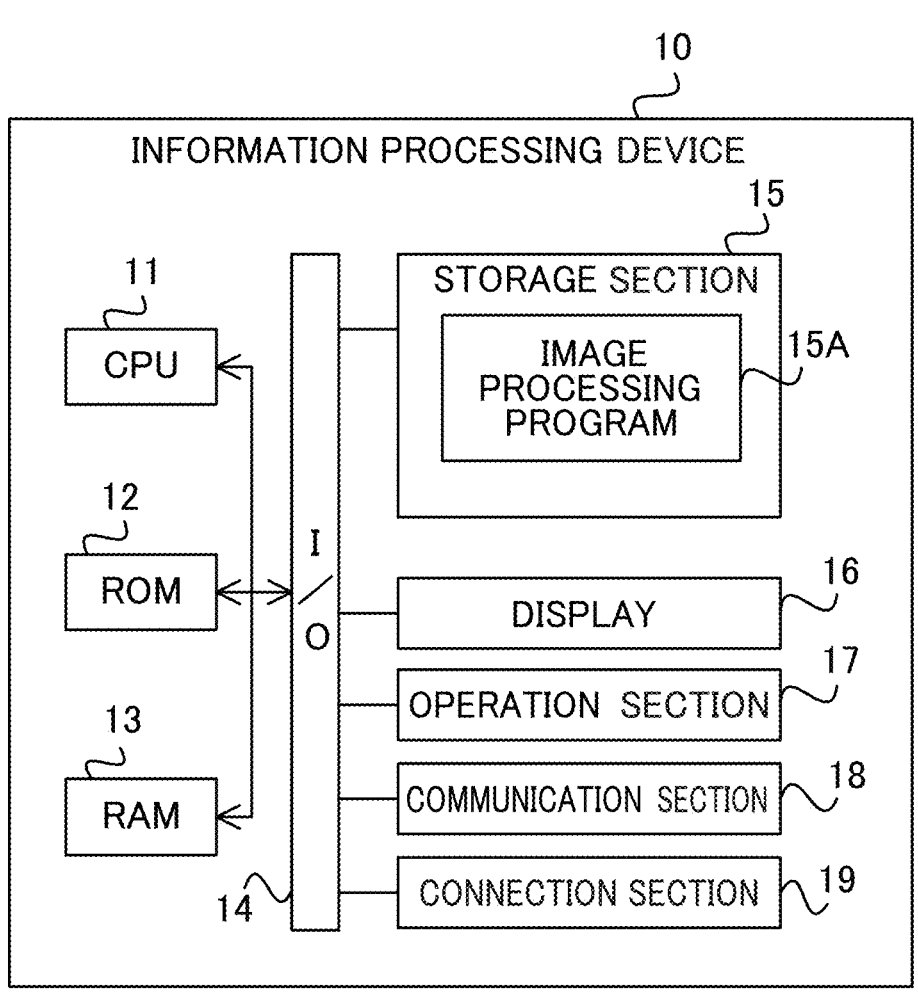
FIG. 3 is a block diagram illustrating an example of an electrical configuration of an information processing device according to the embodiment.

FIG. 3 is a block diagram illustrating an example of an electrical configuration of the information processing device 10 according to the present embodiment.

As illustrated in FIG. 3, the information processing device 10 according to the present embodiment includes a central processing unit (CPU) 11, a read only memory (ROM) 12, a random access memory (RAM) 13, an input/output interface (I/O) 14, a storage section 15, a display 16, an operation section 17, a communication section 18, and a connection section 19. The CPU 11 may be, for example, a processor such as a graphics processing unit (GPU).

For example, a general-purpose computer device such as a personal computer (PC) is applied to the information processing device 10 according to the present embodiment. A portable computer device such as a smartphone or a tablet terminal may be applied to the information processing device 10. The information processing device 10 may be divided into a plurality of units. For example, a unit that controls a measurement system such as the camera 74, the light source 76, the pump 82, or the pump 90, and a unit that processes and analyzes an image imaged by the camera 74 may be included. The information processing device 10 may be externally coupled to the measurement system 70.

The CPU 11, the ROM 12, the RAM 13, and the I/O 14 configure a control device. The control device has, for example, a function of controlling the measurement system such as the camera 74, the light source 76, the pump 82, or the pump 90, and a function of processing and analyzing an image photographed by the camera 74. Each unit of the CPU 11, the ROM 12, the RAM 13, and the I/O 14 is coupled via a bus.

Each functional unit including the storage section 15, the display 16, the operation section 17, the communication section 18, and the connection section 19 is coupled to the I/O 14. These functional units can communicate with the CPU 11 via the I/O 14.

The control device may be configured as a sub-control section that controls a part of the operation of the information processing device 10, or may be configured as a part of a main control section that controls the entire operation of the information processing device 10. For some or all of the blocks of the control device, for example, an integrated circuit such as a large scale integration (LSI) or an integrated circuit (IC) chip set is used. An individual circuit may be used for each of the blocks, or a circuit in which some or all of the blocks are integrated may be used. The blocks may be provided integrally with each other, or some of the blocks may be provided separately. A part of each of the blocks may be provided separately. The integration of the control device is not limited to the LSI, and a dedicated circuit or a general-purpose processor may be used.

As the storage section 15, for example, a hard disk drive (HDD), a solid state drive (SSD), a flash memory, or the like is used. The storage section 15 stores an image processing program 15A for performing measurement system control and image processing according to the present embodiment. The image processing program 15A may be stored in the ROM 12. A memory may be externally attached to the storage section 15 or may be added later.

The image processing program 15A may be installed in advance in the information processing device 10, for example. The image processing program 15A may be realized by being stored in a non-volatile non-transitory storage medium or distributed via a network line and installed or upgraded in the information processing device 10, as appropriate. As an example of the non-volatile non-transitory storage medium, a compact disc read only memory (CD-ROM), a magneto-optical disk, a hard disk drive (HDD), a digital versatile disc read only memory (DVD-ROM), a flash memory, a memory card, and the like are assumed.

As the display 16, for example, a liquid crystal display (LCD), an organic electro luminescence (EL) display, or the like is used. The display 16 may integrally have a touch panel. The operation section 17 includes an operation input device such as a keyboard or a mouse. The display 16 and the operation section 17 receive various types of instructions from a user of the information processing device 10. The display 16 displays various types of information such as a result of processing executed in response to an instruction received from the user or a notification for the processing.

The communication section 18 is coupled to a network line such as the Internet, a local area network (LAN), or a wide area network (WAN), and can communicate with an external device via a network line.

For example, the camera 74, the light source 76, the pump 82, the pump 90, and the like are coupled to the connection section 19. The measurement system such as the camera 74, the light source 76, the pump 82, or the pump 90 is controlled by the above-described control device. The connection section 19 also functions as an input port for inputting an image output from the camera 74.

By the way, as described above, in a case where frame-cut images are checked one by one, visibility of a material component in the image is not good, and thus, there is a case where overlooking of the material component occurs.

On the other hand, the camera 74 according to the present embodiment continuously images a sample flowing through the flow cell 40 in time series, and generates a first image of the sample and a second image in which a portion continuous to the first image in time series overlaps a part of the first image. The information processing device 10 is coupled to the camera 74, acquires the first image and the second image generated by the camera 74, and outputs a composite image obtained by combining the first image and the second image. The composite image is a panoramic image expanded in a flow direction of the flow cell 40. The first image and the second image are continuous in time series and partially overlap each other. By outputting the composite image obtained by combining the first image and the second image, it is possible to improve visibility of the material component in the image as compared with the case of checking the frame-cut images one by one. In particular, in a frame-cut image, since joints between the images are not continuous, a material component positioned between frames (also referred to as a section or frame of a photograph) cannot be imaged, and overlooking of the material component may occur. On the other hand, according to the composite image, imaging can be performed without breaks, and visibility of the image in the flow direction is improved, such that occurrence of overlooking of the material component is suppressed. The plurality of target images are not limited to the first image and the second image, and the same applies to three or more images.

Figure 4:
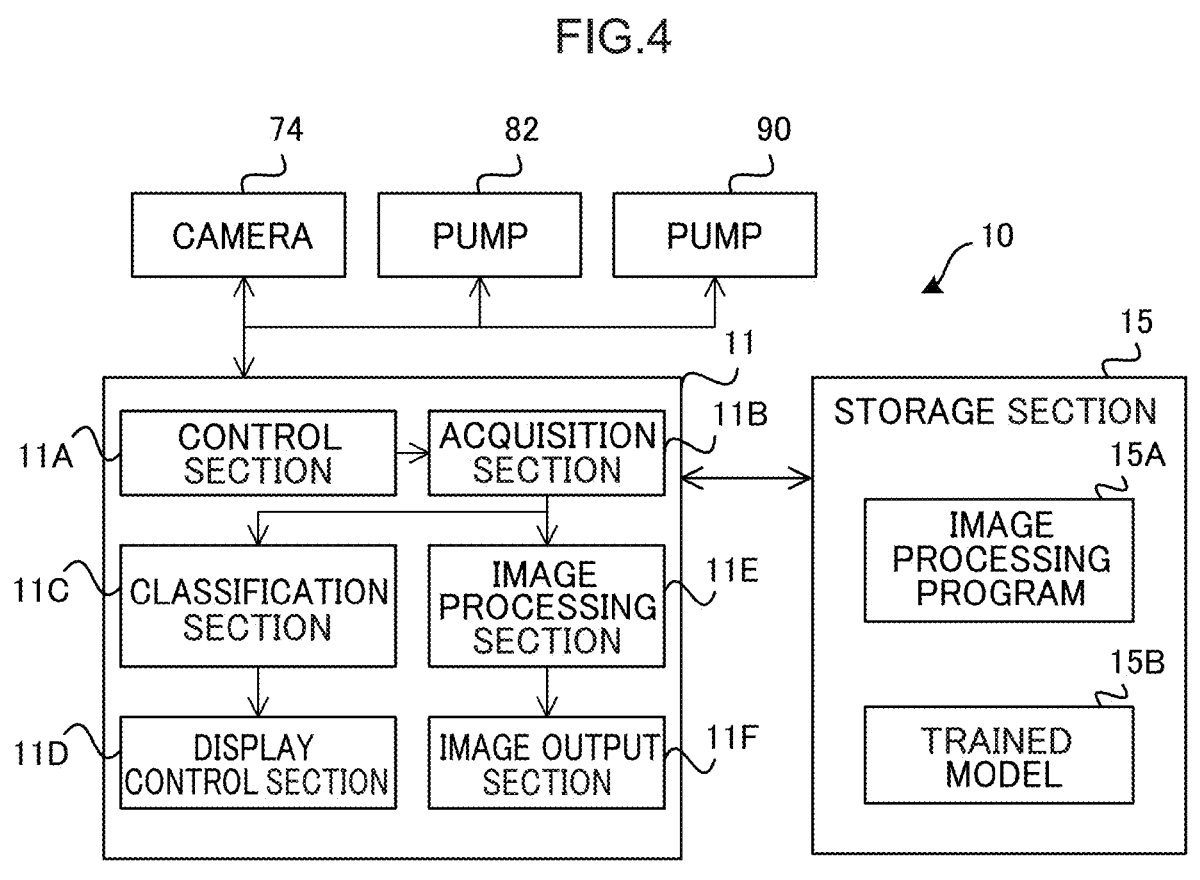

Specifically, the CPU 11 of the information processing device 10 according to the present embodiment functions as each unit illustrated in FIG. 4 by writing and executing the image processing program 15A stored in the storage section 15 in the RAM 13.

FIG. 4 is a block diagram illustrating an example of a functional configuration of the information processing device 10 according to the present embodiment.

As illustrated in FIG. 4, the CPU 11 of the information processing device 10 according to the present embodiment functions as a control section 11A, an acquisition section 11B, a classification section 11C, a display control section 11D, an image processing section 11E, and an image output section 11F.

The control section 11A controls operations of the camera 74, the pump 82, and the pump 90. Each of the pump 82 and the pump 90 is a pump for supplying a sample to the flow cell 40 and causing the sample supplied to the flow cell 40 to flow toward the camera 74, and a sample supply speed is controlled by each of the pump 82 and the pump 90. The control section 11A switches between a first imaging mode for generating a second image that does not overlap a part of the first image and a second imaging mode for generating a second image that overlaps a part of the first image. The second image overlapping a part of the first image means that a part of the sample to be photographed in the first image overlaps a part of the sample to be photographed in the second image. The mode is switched according to a predetermined operation (for example, a button operation or the like) by the user such as a laboratory technician, for example. The first imaging mode is a normal imaging mode in which there is no overlap between the first image and the second image, and the second imaging mode is an imaging mode for creating a composite image in which there is an overlap between the first image and the second image. Hereinafter, the first imaging mode is also referred to as a "normal mode", and the second imaging mode is also referred to as a "composition mode".

First, a case of the first imaging mode will be specifically described.

The storage section 15 stores a trained model 15B used for image classification processing. The trained model 15B is a model used for image classification processing by the classification section 11C.

The acquisition section 11B cuts out a plurality of types of material components included in the specimen fluid as material component images from a plurality of images (as an example, 300 sheets and 1000 sheets) obtained by imaging the sample flowing through the flow cell 40 by the camera 74, and acquires a plurality of cut out material component images.

The classification section 11C classifies the plurality of material component images acquired by the acquisition section 11B as detection components for each predetermined classification (for example, the type, size, shape, presence or absence of nucleus, and the like of the material component). A material component image group classified by the classification section 11C for each predetermined classification is temporarily stored in the storage section 15 by being divided for each specimen. As a method of classifying the material component image, for example, various types of known techniques such as a method using machine learning or a method using pattern matching are applied. The material component image group according to the present embodiment is classified by using, for example, the trained model 15B. The trained model 15B is a model generated by performing machine learning on learning data obtained by associating detection components for each predetermined classification with each of material component images obtained in the past. That is, the learning data is supervised data. The trained model 15B receives the material component image as an input, and outputs the detection component for each predetermined classification. As a learning model for performing the machine learning, for example, a convolutional neural network (CNN: convolutional neural network) or the like is used. As a method of the machine learning, for example, deep learning or the like is used. The material component image group is also referred to as a material component image when described as an individual material component image.

When classifying the material component image, the classification section 11C calculates a matching degree based on the image classification method (as an example, machine learning, pattern matching, and the like) used. The matching degree described herein indicates a classification accuracy for the image of the classification result, and a higher value is assigned to the image for each predetermined classification as the rate of matching with a correct image or a predetermined feature point is higher. When the correct image or the feature point is completely matched, the matching degree is 100%. That is, it is considered that there is a high possibility that a material component image having a relatively low matching degree is not appropriately classified. The matching degree may be expressed as a matching rate.

The display control section 11D performs control to cause the display 16 to display the material component image classified as the detection component by the classification section 11C as individual material component images. As a result, the user such as a laboratory technician can visually check the individual material component images.

Here, a specific screen example in the image classification processing according to the present embodiment will be described with reference to FIGS. 5 and 6.

Figure 5:
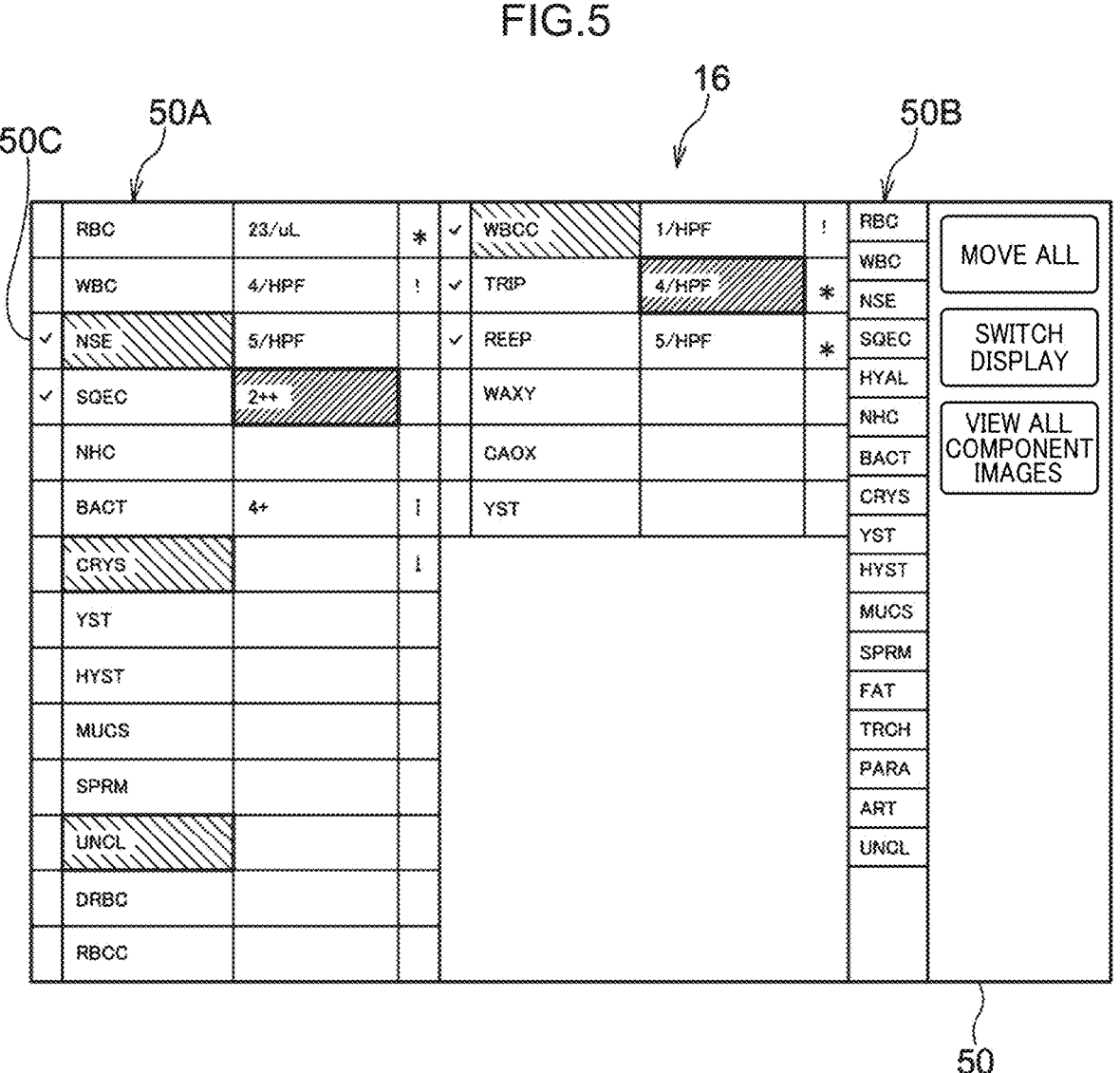
FIG. 5 is a front view illustrating an example of a measurement result screen according to the embodiment.

FIG. 5 is a front view illustrating an example of a measurement result screen 50 according to the present embodiment. The measurement result screen 50 is displayed on the display 16 by the display control section 11D.

As illustrated in FIG. 5, the measurement result screen 50 according to the present embodiment displays a list of measurement results for each item. As the measurement result, a material component name, a content or a number of the components, qualitative display serving as an index of the content, and the like are shown. The measurement result screen 50 includes a material component name 50A and a material component button 50B.

Among the items illustrated in FIG. 5, for example, RBC indicates red blood cells, WBC indicates white blood cells, NSE indicates non-squamous cells, SQEC indicates squamous cells, NHC indicates other cylinders, and BACT indicates bacteria, as main items. CRYS indicates crystal, YST indicates yeast, HYST indicates glass cylinder, MUCS indicates mucilaginous thread, SPRM indicates sperm, and WBCC indicates leukocyte mass. UNCL indicates unclassified.

Here, the display control section 11D performs control to display an image list (see, for example, FIG. 6 described later) of a classification selected from among the classification items on the measurement result screen 50 and assigns a mark indicating that confirmation has been completed to a classification for which the material component image has been confirmed. On the measurement result screen 50 illustrated in FIG. 5, a mark 50C indicating that confirmation has been completed is assigned to the item for which the image list has been confirmed among the classification items. When reclassification (classification change) is performed, a measurement result reflecting the result is displayed.

Figure 6:
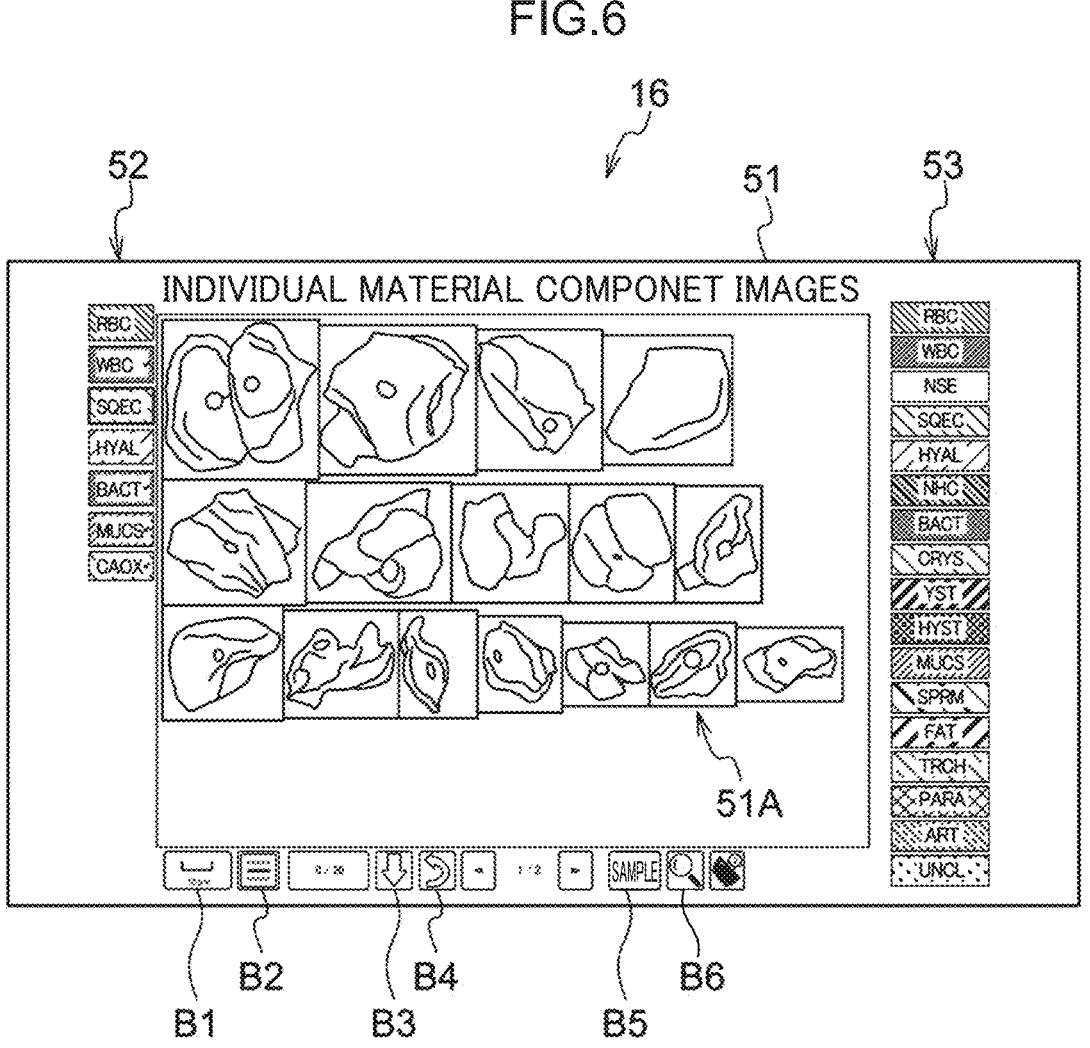
FIG. 6 is a front view illustrating an example of a material component image list screen according to the embodiment.

When the material component name 50A or the material component button 50B is selected by a click operation or the like on the measurement result screen 50 illustrated in FIG. 5, the individual material component images of the selected classification item is displayed on the display 16 as a material component image list screen 51 illustrated in FIG. 6 as an example.

FIG. 6 is a front view illustrating an example of the material component image list screen 51 according to the present embodiment.

As illustrated in FIG. 6, the material component image list screen 51 according to the present embodiment displays a material component image list 51A selected as a material component of which image is desired to be confirmed. The material component image list screen 51 is displayed on the display 16.

The material component image list screen 51 illustrated in FIG. 6 includes a first item button group 52 of the detection component and a second item button group 53 of the movement destination. The first item button group 52 of the detection component is provided for each type of the detection component. Similarly, the second item button group 53 of the movement destination is provided for each classification item of the movement destination. As an example, as described above, "RBC" indicates red blood cells, "WBC" indicates white blood cells, "SQEC" indicates squamous cells, and "UNCL" indicates unclassified. In the example illustrated in FIG. 6, since "SQEC" of the first item button group 52 of the detection component is in a selected state, a list of images of squamous cells is displayed on the material component image list screen 51.

The material component image list screen 51 illustrated in FIG. 6 displays a plurality of operation buttons B1 to B6 in an operable manner. The operation button B1 is a button for enlarging and displaying the material component image and displaying a scale (length) in accordance with the enlargement of the image. In the example illustrated in FIG. 6, the scale is displayed as 10 µm/pixel. The operation button B2 is a button for switching and displaying a material component image having a different focal position. In the example illustrated in FIG. 6, the focal position in the depth direction in the flow cell 40 can be switched corresponding to three layers of an upper layer, a middle layer, and a lower layer. The operation button B3 is a button for moving the material component image of the detection component to the movement destination. The operation button B4 is a button for returning editing work of the image classification to the previous one. The operation button B5 is a button for displaying a material component image to be a "sample". The operation button B6 is a button for displaying a window for setting an enlargement ratio of the material component image and setting a luminance, a contrast ratio, and the like of the material component image.

Since a display mode of the material component image can be changed by operating the plurality of operation buttons B1 to B6 illustrated in FIG. 6, it is easy to determine the material component. Each operation button may be displayed on the display 16, which is a touch panel, or may be provided as the operation section 17.

When any item button of the second item button group 53 of the movement destination is selected by a click operation or the like on the material component image list screen 51 illustrated in FIG. 6, a reclassification work screen (not illustrated) is displayed.

Next, a case of the second imaging mode will be specifically described.

When the user such as a laboratory technician refers to the material component image list screen 51 illustrated in FIG. 6 and any abnormality is recognized in the material component image, the user executes a predetermined operation to switch to the second imaging mode.

In the second imaging mode, a specimen similar to that in the first imaging mode may be used, but it is desirable to flow a concentrated specimen including a material component concentrated by centrifuging the specimen.

The control section 11A controls at least one of an imaging interval by the camera 74 and a sample supply speed by the pumps 82 and 90 such that a sample imaged in the first image and a sample imaged in the second image partially overlap. Specifically, the sample supply speed in the second imaging mode is made slower than the sample supply speed in the first imaging mode. Alternatively, the imaging interval of the second imaging mode may be shorter than the imaging interval of the first imaging mode. Alternatively, the sample supply speed in the second imaging mode may be made slower than the sample supply speed in the first imaging mode, and the imaging interval in the second imaging mode may be made shorter than the imaging interval in the first imaging mode.

The second imaging mode is a mode in which the second image in which the imaging area overlaps the first image is imaged while slowly extruding the specimen as compared with the first imaging mode, and the sheath fluid is used similarly to the first imaging mode. In this case, for example, the sample supply speeds (liquid feeding speed=flow rate) of the specimen fluid and the sheath fluid are made slower than those in the first imaging mode. Only the specimen fluid may be used without using the sheath fluid. In this case, the sample supply speed (liquid feeding speed=flow rate) of the specimen fluid may be made slower than that in the first imaging mode.

For example, an upper limit of a sample supply speed (V) for overlapping imaging between images is a moving speed (V<L/(t2−t1)) at which a distance in which the sample moves from a previous imaging time point (t1) to a next imaging time point (t2) is less than a distance (L) of an imaging field of view. However, in order for all of the imaged samples to overlap, the moving speed is preferably set such that the distance in which the sample moves from the previous imaging to the subsequent imaging is less than half the distance of the imaging field of view. As a result, the material component in the flowing specimen is included in two or more imaged images. In other words, the same material component as the material component shown in the image obtained by imaging at a certain imaging time point is shown in the image obtained by imaging at the next imaging time point. In this example, an example of controlling the sample supply speed has been described, but the imaging interval may be controlled. In the case of the imaging interval, it is sufficient that the camera 74 images the specimen before the specimen reaches a half the distance of the imaging field of view, that is, a shutter speed is increased. In a case where combining of preceding and subsequent images is performed while prioritizing a speed, the overlapping region may be controlled to be 10% or more and 20% or less of the image.

Under the control of the control section 11A, the camera 74 continuously images the sample flowing through the flow cell 40 in time series, and generates a first image of the sample and a second image in which a portion continuous to the first image in time series overlaps a part of the first image.

The acquisition section 11B acquires the first image and the second image generated by the camera 74.

The image processing section 11E composites the first image and the second image acquired by the acquisition section 11B to create one composite image. Specifically, the image processing section 11E specifies a combining position of the first image and the second image based on the imaging interval and the sample supply speed in the second imaging mode. That is, by referring to the imaging interval and the sample supply speed, it is possible to specify how much the preceding and subsequent images are shifted and specify the combining position. As a result, more appropriate image composition can be performed.

The image output section 11F outputs a composite image obtained by combining the first image and the second image by the image processing section 11E. The output destination is, for example, the display 16 or the storage section 15.

Figure 7:
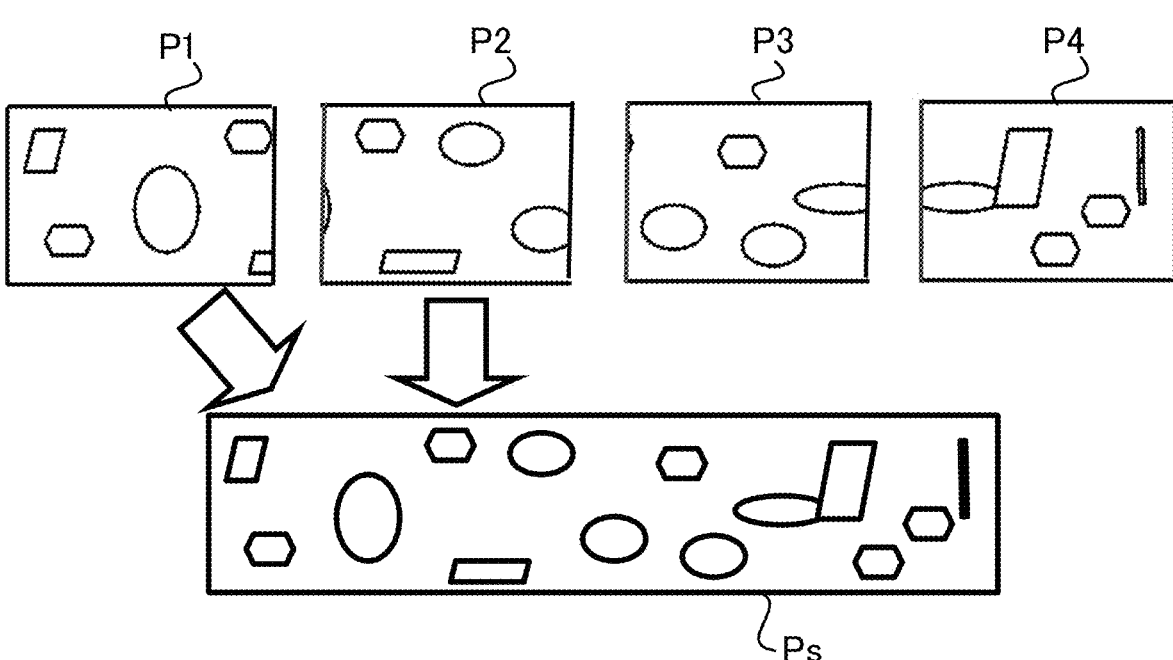
FIG. 7 is a schematic diagram illustrating an example of a composite image obtained by combining a plurality of images according to the embodiment.

FIG. 7 is a schematic diagram illustrating an example of a composite image Ps obtained by combining a plurality of images P1 to P4 according to the present embodiment.

Each of the plurality of images P1 to P4 illustrated in FIG. 7 is a still image including a material component and a portion overlapping with each other. That is, a right end portion of the image P1 and a left end portion of the image P2 overlap, the right end portion of the image P2 and a left end portion of the image P3 overlap, and a right end portion of the image P3 and a left end portion of the image P4 overlap.

Although one large composite image Ps in which these images P1 to P4 are joined is created, for example, a known method is adopted as a method of image composition processing. For example, software called "Image Composite Editor (https://nj-clucker.com/microsoft-image-composite-editor/)" is adopted. By enabling observation as one field of view by the created composite image Ps, it is possible to confirm on the display 16 of the information processing device 10 while sliding like microscopic observation.

Here, an intermittent flow mode, which is a mode in which the second imaging mode is intermittently and repeatedly performed, may be further set. In the intermittent flow mode, a period in which imaging is performed while the sample is supplied at a low speed and a period in which supply of the sample is stopped are provided. During the stop period, by scanning the camera 74 in the depth direction (vertical direction), performing high-speed photographing, and also performing imaging in the depth direction, thereby obtaining depth information as in the microscopic examination. As a result, an image based on an optimum focal position can be obtained.

Next, the action of the information processing device 10 according to the present embodiment will be described with reference to FIG. 8.

Figure 8:
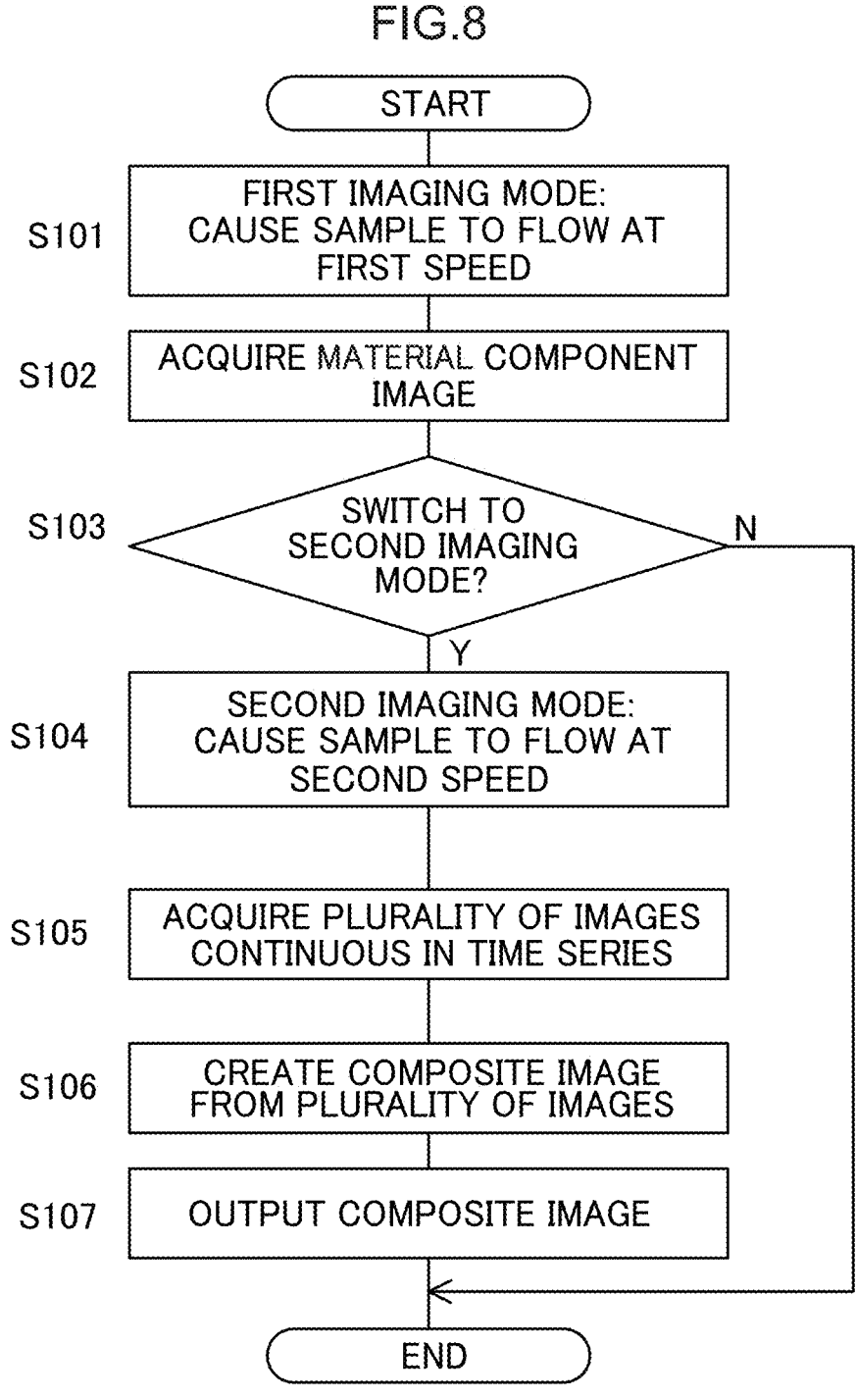
FIG. 8 is a flowchart illustrating an example of a flow of processing by an image processing program according to the embodiment.

FIG. 8 is a flowchart illustrating an example of a flow of processing by the image processing program 15A according to the present embodiment.

The measurement system control and the image processing by the image processing program 15A are executed by the CPU 11 of the information processing device 10 writing the image processing program 15A stored in the ROM 12 or the storage section 15 into the RAM 13.

In step S101 of FIG. 8, the CPU 11 sets a first imaging mode (normal mode) in which imaging is performed such that a part of the sample does not overlap between images, and controls the pumps 82 and 90 to cause the sample to flow to the flow cell 40 at a first speed (=first sample supply speed).

In step S102, the CPU 11 cuts out a plurality of types of material components included in the sample as material component images from a plurality of images obtained by imaging the sample flowing through the flow cell 40 at the first speed according to the first imaging mode set in step S101, and acquires a plurality of cut out material component images. Then, the plurality of acquired material component images are classified as detection components for each predetermined classification (for example, the type, size, shape, presence or absence of nucleus, and the like of the material component), and the classified material component images are displayed on the above-described material component image list screen 51 illustrated in FIG. 6 as an example. The presence or absence of an abnormality is confirmed by the user such as a laboratory technician with respect to the material component images displayed on the material component image list screen 51.

In step S103, the CPU 11 determines whether to switch to the second imaging mode in which a part of the sample overlaps between the images. In a case where it is determined to switch to the second imaging mode (in a case of affirmative determination), the processing proceeds to step S104, and in a case where it is determined not to switch to the second imaging mode (in a case of negative determination), a series of processing by the image processing program 15A ends. Specifically, when the user such as a laboratory technician refers to the material component image list screen 51 illustrated in FIG. 6 and any abnormality is recognized in the material component image, the user executes a predetermined operation to switch to the second imaging mode.

In step S104, the CPU 11 sets the second imaging mode (composition mode) in which the sample is imaged such that a part of the sample overlaps between images, and controls the pumps 82 and 90 to cause the sample to flow to the flow cell 40 at the second speed (=the second sample supply speed). In the second imaging mode, a specimen similar to that in the first imaging mode may be used, but it is desirable to flow a concentrated specimen including a material component concentrated by centrifuging the specimen. Here, as an example, the second sample supply speed in the second imaging mode is controlled to be slower than the first sample supply speed in the first imaging mode. The imaging interval in the second imaging mode may be shorter than the imaging interval in the first imaging mode. Alternatively, the second sample supply speed in the second imaging mode may be made slower than the first sample supply speed in the first imaging mode, and the imaging interval in the second imaging mode may be made shorter than the imaging interval in the first imaging mode.

In step S105, the CPU 11 controls the camera 74 to continuously image the sample flowing through the flow cell 40 in time series, and acquires a plurality of images in which a part of the sample overlaps. As an example, the plurality of images P1 to P4 illustrated in FIG. 7 are acquired. Here, the ratio of overlap between the preceding and subsequent images is desirably, for example, 50% or more for reliable composition, and is desirably, for example, 80% or more for quick imaging.

In step S106, the CPU 11 creates a composite image from the plurality of images acquired in step S105. As an example, the composite image Ps illustrated in FIG. 7 is created.

In step S107, the CPU 11 outputs the composite image created in step S106 to, for example, the display 16 or the storage section 15, and ends the series of processing by the image processing program 15A.

As described above, according to the present embodiment, it is possible to improve visibility of the material component in the image obtained by imaging the sample including the material component. Therefore, it is possible to suppress the occurrence of overlooking of the material component in the image.

According to the present embodiment, a plurality of images in which a part of the sample overlaps is automatically imaged, and one panoramic composite image is created from the plurality of imaged images like an image for microscopic examination. Therefore, it is possible to omit the creation of a slide that takes time and effort when the microscopic examination is performed.

According to the panoramic composite image, observation can be easily performed only by uniaxial sliding in a lateral direction.

When the sample used to create the composite image is not concentrated, the time and effort required for concentration can be eliminated.

Since the composite image can be automatically stored as image information, it is also possible to make a determination that is not based on subjectivity by sharing the composite image among users such as a plurality of laboratory technicians.

In the above embodiment, a processor refers to a processor in a broad sense, and includes a general-purpose processor (for example, CPU: central processing unit, and the like) or a dedicated processor (for example, GPU: graphics processing unit, ASIC: application specific integrated circuit, FPGA: field programmable gate array, programmable logic device, and the like).

The operation of the processor in the above embodiment may be performed not only by one processor but also by cooperation of a plurality of processors existing at physically separated positions. An order of each operation of the processor is not limited to the order described in the above embodiment, and may be changed, as appropriate.

The information processing device according to the embodiment has been described above as an example. The embodiment may be in the form of a program for causing a computer to execute the function of each unit included in the information processing device. The embodiment may be in the form of a non-transitory computer-readable storage medium storing the program.

In addition, the configuration of the information processing device described in the above embodiment is an example, and may be changed according to the situation within a scope not departing from the gist. The display of the material component image is not limited to the above embodiment, and may be displayed side by side on the left and right, for example. The display position of each button can also be changed, as appropriate.

The flow of processing of the program described in the above embodiment is also an example, and unnecessary steps may be deleted, new steps may be added, or the processing order may be changed within a scope not departing from the gist.

In the above-described embodiment, a case where the processing according to the embodiment is realized by a software configuration using a computer by executing a program has been described, but the invention is not limited thereto. The embodiment may be realized by, for example, a hardware configuration or a combination of a hardware configuration and a software configuration.

Regarding the above embodiment, the following is further disclosed.

An information processing device according to a first aspect is an information processing device coupled to an imaging unit that continuously images a sample including a material component and flowing through a flow cell in time series and generates a first image of the sample and a second image in which a portion continuous to the first image in time series overlaps a part of the first image, the device including: an acquisition section configured to acquire the first image and the second image, which are generated by the imaging unit, and an image output section configured to output a composite image obtained by combining the first image and the second image.

An information processing device according to a second aspect, in the information processing device according to the first aspect, further includes a control section configured to control an imaging interval by the imaging unit such that the sample imaged in the first image and a part of the sample imaged in the second image overlap.

An information processing device according to a third aspect, in the information processing device according to the first aspect, is further coupled to a sample supply unit that supplies the sample to the flow cell and causes the sample supplied to the flow cell to flow toward the imaging unit, and the device further includes a control section configured to control at least one of an imaging interval by the imaging unit or a sample supply speed by the sample supply unit such that the sample imaged in the first image and a part of the sample imaged in the second image overlap.

In an information processing device according to a fourth aspect, in the information processing device according to the third aspect, the control section is configured to switch between a first imaging mode for generating the second image that does not overlap a part of the first image and a second imaging mode for generating the second image that overlaps the part of the first image.

In an information processing device according to a fifth aspect, in the information processing device according to the fourth aspect, a sample supply speed in the second imaging mode is slower than a sample supply speed in the first imaging mode.

In an information processing device according to a sixth aspect, in the information processing device according to the fourth aspect, an imaging interval in the second imaging mode is shorter than an imaging interval in the first imaging mode.

In an information processing device according to a seventh aspect, in the information processing device according to the fourth aspect, a sample supply speed in the second imaging mode is slower than a sample supply speed in the first imaging mode, and an imaging interval in the second imaging mode is shorter than an imaging interval in the first imaging mode.

An information processing device according to an eighth aspect, in the information processing device according to any one of the fourth aspect to the seventh aspect, further includes an image processing section configured to combine the first image and the second image to create the composite image, and the image processing section is configured to specify a combining position of the first image and the second image based on an imaging interval and a sample supply speed in the second imaging mode.

In an information processing device according to a ninth aspect, in the information processing device according to any one of the first aspect to the eighth aspect, the composite image is a panoramic image expanded in a flow direction of the flow cell.

A measurement system according to a tenth aspect includes: a flow cell through which a sample including a material component flows; an imaging unit configured to continuously image the sample flowing through the flow cell in time series and generate a first image of the sample and a second image in which a portion continuous to the first image in time series overlaps a part of the first image; and the information processing device according to any one aspect of the first aspect to the ninth aspect, which is coupled to the imaging unit.

An image processing method according to an eleventh aspect is an image processing method by an information processing device coupled to an imaging unit that continuously images a sample including a material component and flowing through a flow cell in time series and generates a first image of the sample and a second image in which a portion continuous to the first image in time series overlaps a part of the first image, the method including: acquiring the first image and the second image, which are generated by the imaging unit; and outputting a composite image obtained by combining the first image and the second image.

An image processing program according to a twelfth aspect is an image processing program of an information processing device coupled to an imaging unit configured to continuously image a sample, including a material component and flowing through a flow cell, in time series and generate a first image of the sample and a second image in which a portion continuous to the first image in time series overlaps a part of the first image, for causing a computer to execute processing, the processing comprising: acquiring the first image and the second image, which are generated by the imaging unit; and outputting a composite image obtained by combining the first image and the second image.

What is claimed is:

1. An information processing device coupled to an imaging unit that continuously images a sample, including a material component and flowing through a flow cell, in time series and generates a first image of the sample and a second image in which a portion continuous to the first image in time series overlaps a part of the first image, the device comprising:

a memory; and a processor coupled to the memory, wherein the processor is configured to:

acquire the first image and the second image generated by the imaging unit, and output a composite image obtained by combining the first image and the second image, wherein the first and the second images are two dimensional images, the information processing device is further coupled to a sample supply unit that supplies the sample to the flow cell and causes the sample supplied to the flow cell to flow toward the imaging unit, the processor controls at least one of an imaging interval by the imaging unit or a sample supply speed by the sample supply unit such that the sample imaged in the first image and a part of the sample imaged in the second image overlap, the processor switches between a first imaging mode for generating the second image that does not overlap a part of the first image and a second imaging mode for generating the second image that overlaps the part of the first image, and a sample supply speed in the second imaging mode is slower than a sample supply speed in the first imaging mode.

2. The information processing device according to claim 1, wherein:

the processor controls an imaging interval by the imaging unit such that the sample imaged in the first image and a part of the sample imaged in the second image overlap.

3. The information processing device according to claim 2, wherein:

a ratio of overlap between the first image and the second image is 50% or more.

4. The information processing device according to claim 2, wherein:

a ratio of overlap between the first image and the second image is 80% or more.

5. The information processing device according to claim 1, wherein:

an imaging interval in the second imaging mode is shorter than an imaging interval in the first imaging mode.

6. The information processing device according to claim 1, wherein:

an imaging interval in the second imaging mode is shorter than an imaging interval in the first imaging mode.

7. The information processing device according to claim 1, wherein:

the processor combines the first image and the second image to create the composite image, and the processor specifies a combining position of the first image and the second image based on an imaging interval and a sample supply speed in the second imaging mode.

8. The information processing device according to claim 1, wherein:

the composite image is a panoramic image expanded in a flow direction of the flow cell in which a material component captured in both the first image and the second image are overlapped.

9. A measurement system comprising:

a flow cell through which a sample including a material component flows;

an imaging unit configured to continuously image the sample, flowing through the flow cell, in time series and generate a first image of the sample and a second image in which a portion continuous to the first image in time series overlaps a part of the first image; and the information processing device according to claim 1, which is coupled to the imaging unit.

10. An image processing method by an information processing device coupled to an imaging unit that continuously images a sample, including a material component and flowing through a flow cell, in time series and generates a first image of the sample and a second image in which a portion continuous to the first image in time series overlaps a part of the first image, the method comprising:

by the information processing device, acquiring the first image and the second image generated by the imaging unit; and outputting a composite image obtained by combining the first image and the second image, wherein the first and the second images are two dimensional images, the first image and the second image are generated in:

a first imaging mode for generating the second image that does not overlap a part of the first image; or a second imaging mode for generating the second image that overlaps the part of the first image, and a sample supply speed in the second imaging mode is slower than a sample supply speed in the first imaging mode.

11. The image processing method according to claim 10, wherein:

an imaging interval between the first image and the second image is controlled such that the sample imaged in the first image and a part of the sample imaged in the second image overlap.

12. The image processing method according to claim 11, wherein:

a ratio of overlap between the first image and the second image is 50% or more.

13. The image processing method according to claim 11, wherein:

a ratio of overlap between the first image and the second image is 80% or more.

14. A non-transitory storage medium storing an image processing program of an information processing device coupled to an imaging unit configured to continuously image a sample, including a material component and flowing through a flow cell, in time series and generate a first image of the sample and a second image in which a portion continuous to the first image in time series overlaps a part of the first image, for causing a computer to execute processing, the processing comprising:

acquiring the first image and the second image generated by the imaging unit; and outputting a composite image obtained by combining the first image and the second image, wherein the first and the second images are two dimensional images, the first image and the second image are generated in:

a first imaging mode for generating the second image that does not overlap a part of the first image; or a second imaging mode for generating the second image that overlaps the part of the first image, and a sample supply speed in the second imaging mode is slower than a sample supply speed in the first imaging mode.

15. The non-transitory storage medium according to claim 14, wherein:

an imaging interval between the first image and the second image is controlled such that the sample imaged in the first image and a part of the sample imaged in the second image overlap.

16. The non-transitory storage medium according to claim 15, wherein:

a ratio of overlap between the first image and the second image is 50% or more.

17. The non-transitory storage medium according to claim 15, wherein:

a ratio of overlap between the first image and the second image is 80% or more.

* * * * *